(12) United States Patent
Nieslony

(10) Patent No.: US 7,040,667 B2
(45) Date of Patent: May 9, 2006

(54) CLAMPING ASSEMBLY

(75) Inventor: Markus Nieslony, Salach (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 10/258,104

(22) PCT Filed: Feb. 1, 2002

(86) PCT No.: PCT/DE02/00371

§ 371 (c)(1),
(2), (4) Date: Jan. 31, 2003

(87) PCT Pub. No.: WO02/066823

PCT Pub. Date: Aug. 29, 2002

(65) Prior Publication Data

US 2003/0152424 A1    Aug. 14, 2003

(30) Foreign Application Priority Data

Feb. 21, 2001 (DE) ............................ 101 08 201

(51) Int. Cl.
*F16L 27/00* (2006.01)
(52) U.S. Cl. ............ 285/276; 285/280; 285/921; 285/321; 123/296
(58) Field of Classification Search ............ 285/276, 285/278, 280, 921, 321; 123/296
See application file for complete search history.

(56) References Cited

U.S. PATENT DOCUMENTS

| 1,771,949 | A |   | 7/1930  | Blanchard |
| 4,209,193 | A | * | 6/1980  | Ahlstone ............... 285/321 |
| 4,240,654 | A | * | 12/1980 | Gladieux ............... 285/276 |
| 4,548,427 | A | * | 10/1985 | Press et al. ............ 285/302 |
| 4,783,100 | A | * | 11/1988 | Klein .................... 285/276 |
| 4,872,710 | A | * | 10/1989 | Konecny et al. ........ 285/321 |
| 4,982,983 | A | * | 1/1991  | Lenzi et al. ............ 285/281 |
| 5,176,414 | A | * | 1/1993  | Daniele ................. 285/321 |
| 5,845,944 | A | * | 12/1998 | Enger et al. ............ 285/321 |

FOREIGN PATENT DOCUMENTS

DE        23 03 506        8/1974

* cited by examiner

*Primary Examiner*—David Bochna
(74) *Attorney, Agent, or Firm*—Kenyon & Kenyon

(57) ABSTRACT

A clamping assembly has a first component and a second component, which has an essentially cylindrical outer jacket, which is attachable to the first component. The clamping assembly has a support surface supported against the first component, which is able to be clamped against the first component via a clamping sleeve that is slid onto the outer jacket and may be screwed onto the first component, and via a snap ring that comes to rest against a first clamping shoulder formed on the inner wall of the clamping sleeve and against a second clamping shoulder formed on the outer jacket of the second component. The snap ring is configured as a detent that deflects elastically in a radial direction and the outer jacket of the second component is provided with an undercut behind the second clamping shoulder, when viewed in the axial direction, into which the elastically deflecting snap ring is able to be deformed radially inwardly so that the clamping sleeve may be guided over the snap ring when slid onto the outer jacket of the second component and the snap ring is able to be brought into engagement in an annular groove on the inner wall that is configured as an opposing detent.

11 Claims, 4 Drawing Sheets

CLAMPING ASSEMBLY

FIELD OF THE INVENTION

The invention relates to a clamping assembly, such as, for example, for use on a fuel injector.

BACKGROUND INFORMATION

A clamping assembly of this type is discussed, for example, in German Published Patent Application No. 2 303 506. The clamping assembly shown there includes, as a first component, a cylinder head of an internal combustion engine. A fuel injector, representing the second component and having an essentially cylindrically shaped outer cover, has a support surface that rests against the cylinder head in a recess of the same and is clamped in the cylinder head via a clamping sleeve that is configured as a hollow screw and via a snap ring that is set in an annular groove of the fuel injector, for which purpose the clamping sleeve has an external thread that may be screwed into an internal thread of the cylinder head. For this purpose, the clamping sleeve has a recess on its end facing the cylinder head that functions as a first clamping shoulder and in which the snap ring comes to rest when the clamping sleeve is tightened. The section of the annular groove of the fuel injector that faces the cylinder head functions as a second clamping shoulder. The snap ring is clamped between the first and second clamping shoulders upon tightening.

In the clamping assembly, the clamping sleeve is slid onto that end of the fuel injector, representing the second component, which faces away from the support surface of the first component and is located behind the snap ring when viewed from the cylinder head. This may require that the diameter of the second component behind the snap ring be configured to be smaller than the inner diameter of the clamping sleeve all the way around, so that the clamping sleeve may be slid over the outer jacket without a problem. This part of the outer jacket may therefore need to have no steps, nor any laterally projecting supports. Moreover, these conditions may require increased cutting and deformation effort in the production of the second component. For example, if, in addition, the first component should have an external thread and the clamping sleeve an internal thread that is screwed together with the external thread of the first component, the section of the clamping sleeve provided with the internal thread may be required to be slid over the outer jacket of the second component, which, on the one hand, may require a great amount of play between the internal thread of the clamping sleeve and the outer jacket and, on the other hand, may result in the internal thread of the clamping sleeve being damaged, for example, by pushing against the snap ring.

SUMMARY OF THE INVENTION

In an example clamping assembly of the present invention, the clamping sleeve may be slid, from the end of the second component that faces out toward the support surface of the first component, onto the outer jacket of the second component. Due to the feature that the snap ring may be configured as a detent which elastically deflects in the radial direction, and that the second component has an undercut into which the snap ring may deform, and that an annular groove accommodating the snap ring may be formed on the inner wall of the clamping sleeve as an opposing detent, the clamping sleeve, when it is slid on, may be slid a bit past the snap ring, until the snap ring, which is elastically pretensioned as a result, snaps into the annular groove of the clamping sleeve, thereby captively mounting the clamping sleeve on the second component. When the clamping sleeve is subsequently screwed together with the first component, the snap ring is drawn out from the undercut and pressed against the clamping shoulder of the second component. A feature of this is that the threaded section of the clamping sleeve may not have to be pushed over the snap ring. By using the clamping assembly of the present invention, a robust attachment of the two components may be achieved, requiring little assembly effort and also, in particular, little structural space. The components may be joined only after complete machining, so that no captive parts have to be handled during the production process.

If the second clamping shoulder is disposed to the side of the support surface and functions as an axial delimitation of an annular groove in the second component, which has a depth that is greater than the wire diameter of the snap ring, and the annular groove has a stop face for the snap ring opposite the second clamping shoulder, the snap ring may come to rest against the stop face and automatically deform radially inwardly and into the undercut when the clamping sleeve is slid on.

The inner wall of the clamping sleeve may have, at its end that is pressed onto the second component, a peripheral chamfer that facilitates the sliding on of the snap ring. When the clamping sleeve is slid on, the chamfer of the clamping sleeve may cooperate with the stop face of the second component in such a manner that the snap ring is deformed so as to slide radially inwardly into the undercut all along the chamfer without the aid of any tools.

The undercut may be made on the second component to be formed by an essentially conical surface bordering on the clamping shoulder, since in this case, when the clamping sleeve is screwed together with the first component, the conical surface may exercise a centering effect on the snap ring, which is snapped into the clamping sleeve, and on the clamping sleeve itself.

DETAILED DESCRIPTION

Figure 1:
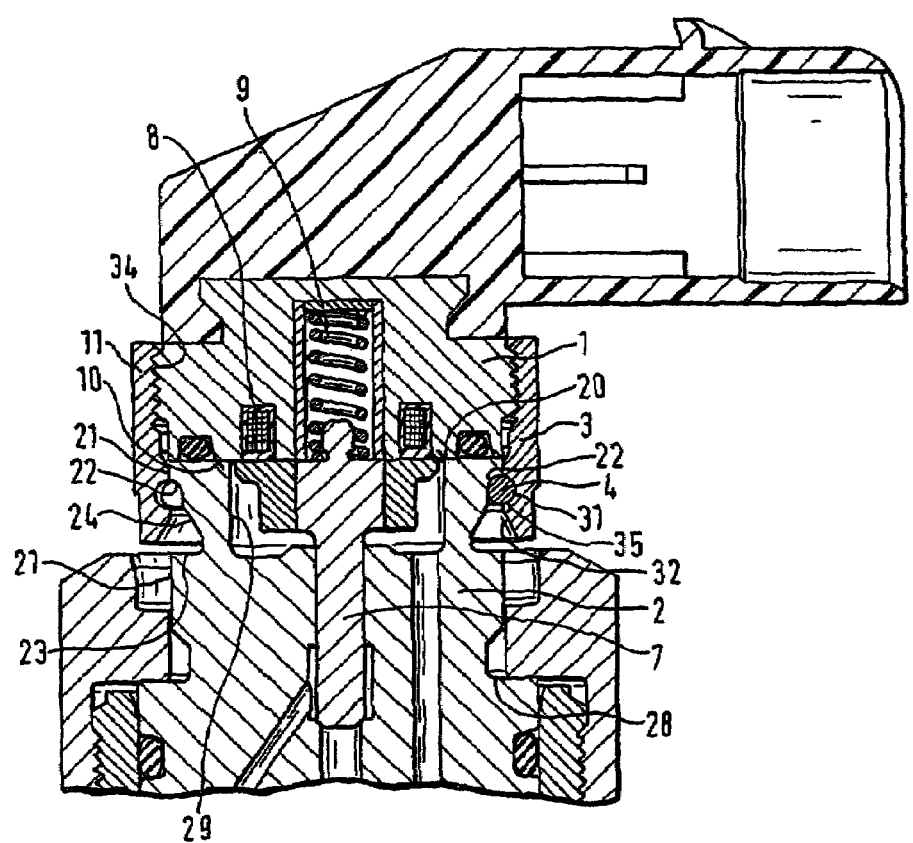
FIG. 1 is a cross-section through the clamping assembly of the present invention that, in the illustrated example embodiment, is disposed on the fuel injector of an internal combustion engine.

FIG. 1 shows a first example embodiment of a clamping assembly of the present invention. In this example embodiment, the clamping assembly is mounted on a fuel injector for internal combustion engines, a first component 1 of the clamping assembly being formed by the magnet assembly of the fuel injector. Magnet assembly 1 includes a magnetic core having pole face 10 and coil 8, as well as a valve spring 9, which impinges an axially movable armature 7 having a tie plate and tie bolt. A valve assembly of the fuel injector represents a second component 2 of the clamping assembly. Valve assembly 2 has a support surface 20 supported against pole face 10 of magnet assembly 1. A recess 29 in support surface 20 forms an armature compartment to accommodate armature 7. The movable armature controls the discharge of fuel from its control pressure chamber, which in turn controls the injection operation of the fuel injector. As illustrated in FIG. 1, the clamping assembly also includes a clamping sleeve 3 and a snap ring 4.

Figure 3:
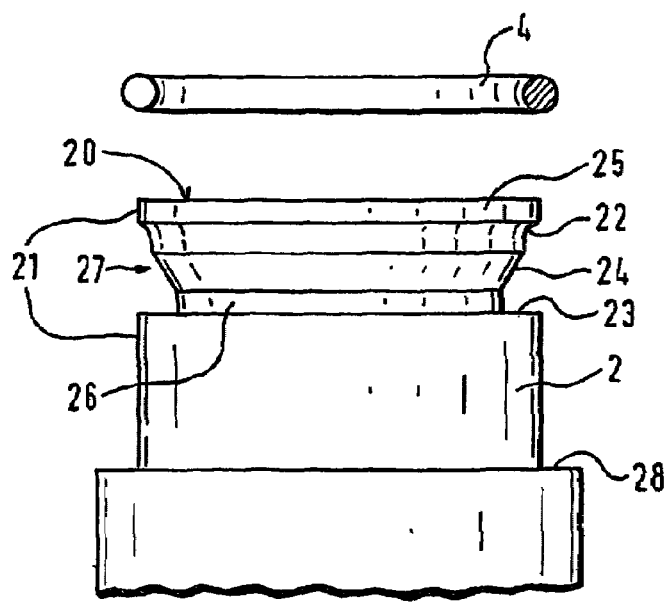
FIGS. 3 through 7 show the assembly of the clamping assembly in a simplified representation.

As may be recognized in the simplified representation of FIG. 3, first component 2 has, on a part of its length, a cylindrical outer jacket 21 that may not need to extend over the entire length of component 2. In the example embodiment illustrated here, cylindrical outer jacket section 21 is delimited by a shoulder 28, for example. Close to a support surface 20 of second component 2, an annular groove 27 is introduced in outer jacket 21 of second component 2 so that a narrow section 25 of outer jacket 21 forms a peripheral collar. Starting from collar 25, annular groove 27 forms a second clamping shoulder 22 which is intended to hold a snap ring 4 and which has, adjacent to it, an undercut 24 in the form of a conical surface having a tapered diameter. The conical surface transitions into a short cylindrical face section, which in turn projects from an annular face arranged opposite clamping shoulder 22 and running perpendicular to outer jacket 21. Annular face 23 functions as a stop face for snap ring 4.

Figure 2:
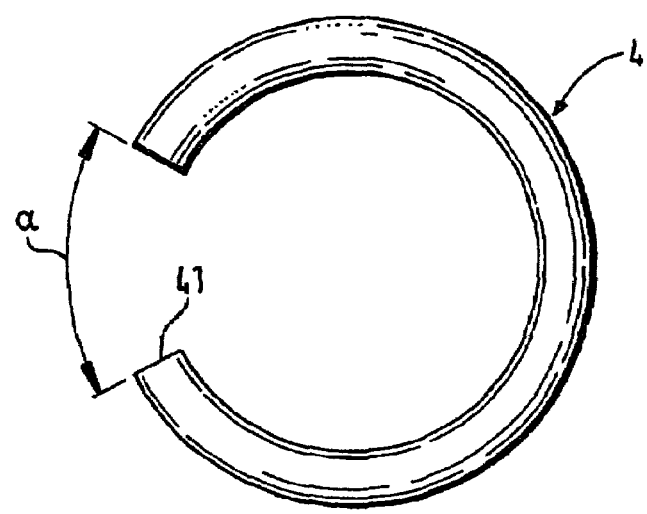
FIG. 2 is a top view of the snap ring.
Figure 4:
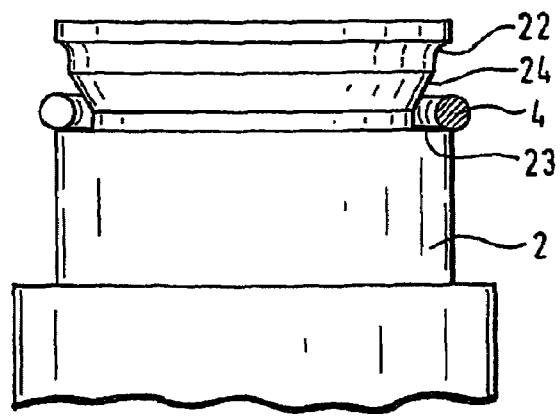
Figure 5:
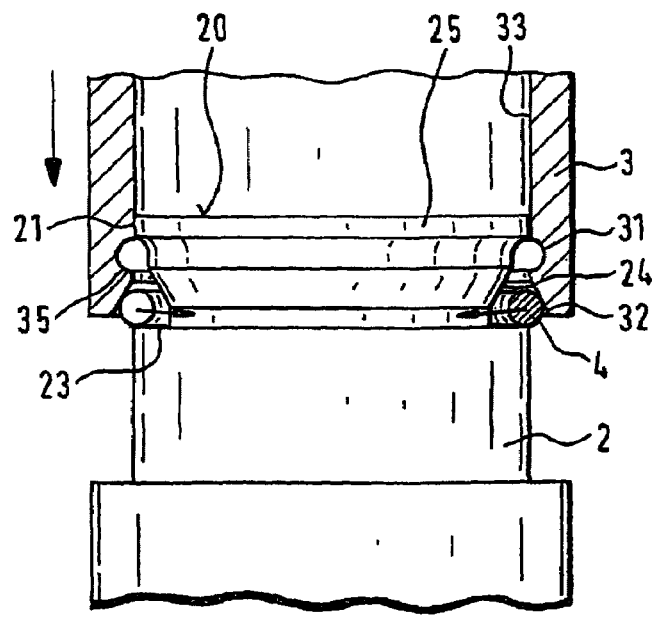

Snap ring 4 is illustrated in FIG. 2 and FIG. 3. The snap ring may be made out of an elastically deflecting material, such as an elastically flexible metal and, in the example embodiment illustrated here, has a circular wire cross section. However, other cross-sections may also be possible. As may be recognized in FIG. 2, the snap ring has an opening 41. The angle a subtended by opening 41 is dimensioned in such a manner that, on the one hand, snap ring 4 permits radial deflection while clamping sleeve 3 is being mounted (FIG. 5), but that, on the other hand, the support angle (360°−a), that is the angle subtended by the snap ring when it comes to rest against second clamping shoulder 22, is not too small. In an example embodiment, opening angle a may be between 40° and 60°. Elastic element snap ring 4 may be bent outward somewhat when being mounted on second component 2 and, using opening 41, be clipped into annular groove 27 of second component 2 or be guided in the axial direction over peripheral collar 25, as is illustrated in FIG. 4. The elasticity of snap ring 4 is calculated to be large enough so that it is not permanently deformed in the course of being positioned on second component 2 and during subsequent deflection into annular groove 27 (FIG. 5). Before clamping sleeve 3 is mounted, snap ring 4 rests against stop face 23 in such a manner that it is radially movable, as is illustrated in FIG. 4.

As is recognizable in FIG. 1 and FIG. 5, clamping sleeve 3 has a cylindrical inner wall 33 having an internal thread 34. For the sake of simplicity, internal thread 34 is not depicted in FIG. 5. Internal wall 33 of clamping sleeve 3 has an annular groove 31 and a chamfer 32 on the end facing away from internal thread 34. As illustrated in FIG. 5, clamping sleeve 3 is slid from support surface 20 of second component 2 out onto outer jacket 21 until chamfer 32 butts against snap ring 4. When the clamping sleeve is slid further, snap ring 4, which rests against stop face 23, is first elastically compressed, sliding radially inwardly along chamfer 32, and in the process penetrates into undercut 24.

Figure 6:
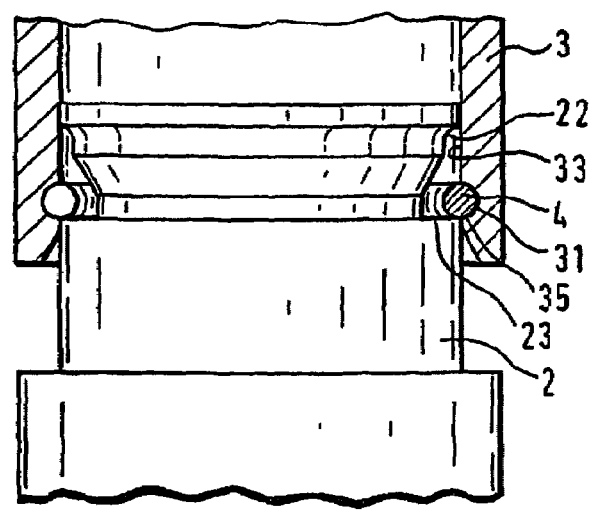
Figure 7:
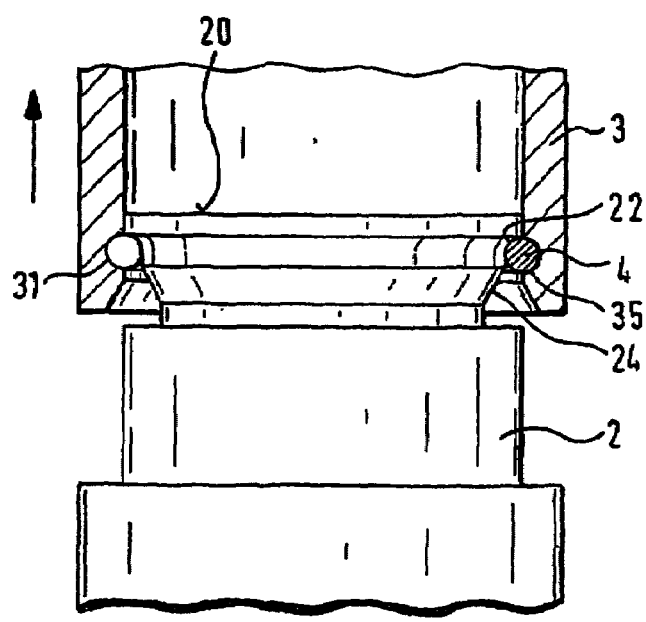

When clamping sleeve 3 is slid further, snap ring 4, which is elastically pretensioned against inner wall 33, snaps into annular groove 31 on inner wall 33 of clamping sleeve 3, as illustrated in FIG. 6. Snap ring 4 is thus encompassed in a press fit over approximately half of the perimeter by annular groove 31. Clamping sleeve 3 is then captively connected to second component 2. Clamping sleeve 3 may be moved axially back and forth, the axial mobility of clamping sleeve 3 being limited by second clamping shoulder 22 and stop face 23. As shown in FIG. 7, clamping sleeve 3 is now slid in the direction of the arrow, counter to the direction of joining indicated in FIG. 5, until snap ring 4 comes to rest against second clamping shoulder 22. In the process, snap ring 4 first slides over the conical surface of undercut 24 and is thus automatically centered, together with clamping sleeve 3. In this position, clamping sleeve 3, via internal thread 34, is screwed together with external thread 11 of first component 1, as is shown in FIG. 1. In the process, support surface 20 of second component 2 comes to rest against surface 10 of first component 1. When clamping sleeve 3 is tightened, second component 2 is clamped against component 1 and is thereby secured on it. The snap ring is clamped between second clamping shoulder 22 and first clamping shoulder 35, which is formed by a section of annular groove 31.

The clamping assembly depicted here may be used in multiple forms. In no way is it limited to the example embodiment described above, but, rather, may generally be used in those cases in which a first component is joined via a clamping sleeve and a snap ring to a second component having a cylindrical outer jacket. In a departure from the example embodiment described above, the clamping sleeve may be provided with an external thread and the first component may be provided with an internal thread. Moreover, stop face 23, for example, may be omitted if, in the assembly of clamping sleeve 3, snap ring 4 is pressed on using an appropriately configured tool, until it snaps into annular groove 32 of clamping sleeve 3. Moreover, undercut 24 may be configured using a non-conical face. It may be important for undercut 24, when viewed from support surface 20, to form, behind clamping shoulder 22, an open space which is used to hold snap ring 3, which is elastically compressed in the radial direction, so that clamping sleeve 3 is able to slide over snap ring 4 until the latter snaps into annular groove 31.

What is claimed is:

1. A clamping assembly comprising:
a first component;
a second component fastenable to the first component, the second component including a support surface for supporting against the first component, an essentially cylindrical outer jacket, and a second clamping shoulder formed on the outer jacket, the outer jacket including an undercut behind the second clamping shoulder in an axial direction as viewed looking out from the support surface;
a clamping sleeve to clamp the second component against the first component, the clamping sleeve being slidable onto the outer jacket and being screwed together with the first component, the clamping sleeve including an inner wall having a first clamping shoulder and an annular groove formed on the inner wall; and
a snap ring to assist in clamping the second component against the first component, the snap ring being a detent to elastically deflect radially and being snappable into engagement in the annular groove that acts as an opposing detent, the snap ring being pretensioned against the inner wall and deformable radially inward into the undercut so that the clamping sleeve, when slid onto the outer jacket, is guidable from the support surface out over the snap ring, the snap ring resting against the first clamping shoulder and the second clamping shoulder when fitted;
wherein the clamping assembly is arranged on a fuel injector of an internal combustion engine.

2. The clamping assembly according to claim 1, wherein the second component includes an annular groove having a depth greater than a wire cross-section of the snap ring, and the second clamping shoulder is disposed to a side of the support surface and functions as an axial delimitation of the annular groove.

3. The clamping assembly according to claim 2, wherein the annular groove of the second component includes a stop face for the snap ring arranged opposite the second clamping shoulder.

4. The clamping assembly according to claim 3, wherein the clamping sleeve includes a chamfer arranged to cooperate with a stop face of the second component so that the snap ring that is arranged to come to rest against the stop face when the clamping sleeve is slid on is deformable radially and inwardly, sliding into the undercut along the chamfer.

5. The clamping assembly according to claim 1, wherein the inner wall includes a peripheral chamfer on an end that is slid onto the second component.

6. The clamping assembly according to claim 1, wherein the second clamping shoulder is adapted to a shape of a wire cross-section of the snap ring.

7. The clamping assembly according to claim 1, wherein the snap ring includes a circular wire cross-section.

8. The clamping assembly according to claim 1, wherein the clamping sleeve has an internal thread and the first component has an external thread.

9. A clamping assembly comprising:
a first component;
a second component fastenable to the first component, the second component including a support surface for supporting against the first component, an essentially cylindrical outer jacket, and a second clamping shoulder formed on the outer jacket, the outer jacket including an undercut behind the second clamping shoulder in an axial direction as viewed looking out from the support surface;
a clamping sleeve to clamp the second component against the first component, the clamping sleeve being slidable onto the outer jacket and being screwed together with the first component, the clamping sleeve including an inner wall having a first clamping shoulder and an annular groove formed on the inner wall; and
a snap ring to assist in clamping the second component against the first component, the snap ring being a detent to elastically deflect radially and being snappable into engagement in the annular groove that acts as an opposing detent, the snap ring being pretensioned against the inner wall and deformable radially inward into the undercut so that the clamping sleeve, when slid onto the outer jacket, is guidable from the support surface out over the snap ring, the snap ring resting against the first clamping shoulder and the second clamping shoulder when fitted;
wherein the undercut is formed by an essentially conical face that is directly adjacent to the second clamping shoulder.

10. A clamping assembly comprising:
a first component;
a second component fastenable to the first component, the second component including a support surface for supporting against the first component, an essentially cylindrical outer jacket, and a second clamping shoulder formed on the outer jacket, the outer jacket including an undercut behind the second clamping shoulder in an axial direction as viewed looking out from the support surface;
a clamping sleeve to clamp the second component against the first component, the clamping sleeve being slidable onto the outer jacket and being screwed together with the first component, the clamping sleeve including an inner wall having a first clamping shoulder and an annular groove formed on the inner wall; and
a snap ring to assist in clamping the second component against the first component, the snap ring being a detent to elastically deflect radially and being snappable into engagement in the annular groove that acts as an opposing detent, the snap ring being pretensioned against the inner wall and deformable radially inward into the undercut so that the clamping sleeve, when slid onto the outer jacket, is guidable from the support surface out over the snap ring, the snap ring resting against the first clamping shoulder and the second clamping shoulder when fitted;
wherein the annular groove that is provided as an opposing detent encompasses a wire cross-section of the snap ring in a press fit over approximately half of a perimeter.

11. A clamping assembly comprising:
a first component;
a second component fastenable to the first component, the second component including a support surface for supporting against the first component, an essentially cylindrical outer jacket, and a second clamping shoulder formed on the outer jacket, the outer jacket including an undercut behind the second clamping shoulder in an axial direction as viewed looking out from the support surface;
a clamping sleeve to clamp the second component against the first component, the clamping sleeve being slidable onto the outer jacket and being screwed together with the first component, the clamping sleeve including an inner wall having a first clamping shoulder and an annular groove formed on the inner wall; and
a snap ring to assist in clamping the second component against the first component, the snap ring being a detent to elastically deflect radially and being snappable into engagement in the annular groove that acts as an opposing detent, the snap ring being pretensioned against the inner wall and deformable radially inward into the undercut so that the clamping sleeve, when slid onto the outer jacket, is guidable from the support surface out over the snap ring, the snap ring resting against the first clamping shoulder and the second clamping shoulder when fitted;
wherein the snap ring that snaps into the annular groove is clampable between the first clamping shoulder and the second clamping shoulder by screwing together the clamping sleeve and the first component.

* * * * *